United States Patent [19]

Jönsson et al.

[11] Patent Number: 5,137,155
[45] Date of Patent: Aug. 11, 1992

[54] METHOD AND AN APPARATUS FOR TREATING PLANT FIBRES

[75] Inventors: Christer Jönsson; Arne Svensson, both of Köpingebro, Sweden

[73] Assignee: Fibrex AB, Arlov, Sweden

[21] Appl. No.: 389,366

[22] Filed: Aug. 3, 1989

[30] Foreign Application Priority Data

Dec. 8, 1988 [SE] Sweden .................... 8804437

[51] Int. Cl.$^5$ .................... B03B 9/00; B07B 9/00
[52] U.S. Cl. .................... 209/2; 209/10; 209/11; 209/31; 99/484; 426/478
[58] Field of Search .................... 426/481, 456, 464, 478, 426/615, 640; 209/1-3, 10, 11, 21, 30, 31, 233, 238, 240; 99/483, 484, 516, 517

[56] References Cited

U.S. PATENT DOCUMENTS 1,787,161 12/1930 Neighbour .
4,770,886 9/1988 Lee .................... 426/481 X
4,905,585 3/1990 Lee .................... 99/510

FOREIGN PATENT DOCUMENTS 0836802  3/1970  Canada .
2906231  8/1980  Fed. Rep. of Germany .
3009575  9/1981  Fed. Rep. of Germany .
WO83/01445  4/1983  PCT Int'l Appl. .
2026537A  2/1980  United Kingdom .

Primary Examiner—Michael S. Huppert
Assistant Examiner—Edward M. Wacyra
Attorney, Agent, or Firm—Ladas & Parry

[57] ABSTRACT

A method and an apparatus for removing impurities from plant fibrous material which constitutes residual products in the refining of tuber or root vegetables, fruits etc. The plant fibrous material is, for forming a first substance, adjusted to a TS content of at least approx. 25% whereafter the first substance is fractionated in a first screening device to form a first fraction. The TS content of the first fraction is reduced, for the formation of a first mass, whereafter the mass is dried, for the formation of a second substance. This is fractionated in a second screening device to form a second fraction which substantially exclusively consists of plant fibres.

18 Claims, 1 Drawing Sheet

METHOD AND AN APPARATUS FOR TREATING PLANT FIBRES

TECHNICAL FIELD

The present invention relates to a method and an apparatus for treating plant fibrous material to remove impurities therefrom.

BACKGROUND ART

In conjunction with the processing of certain agricultural product, a plant fibrous material is formed which, in addition to the plant fibres, also contains impurities. As non-restrictive examples of such plant fibrous materials, mention might be made of a pulp constituting the residual product from the recovery of sugar from sugar beets and different types of products which normally constitute residual products after the processing of tuber or root vegetables or of fruits. Examples of such tuber and root vegetables are potatoes and carrots, and examples of such fruits are apples, citrus fruits etc. In recent years, plant fibres, for instance from plant fibrous materials of the above kind, have been put to increasing use for human consumption, primarily because it has been found that, by the consumption of such fibres, the body is supplied with important components, that the fibres have a low calorie content and that they stimulate the peristalsis in the intestine, viz this latter having obvious medical advantages. Materials containing plant fibres intended for human consumption are often named dietary fibre products. The most common type of dietary fibre consists of cellulose, hemicellulose, pectin and lignin. That part of the plant cell walls which is not digested or broken down by the enzymes of the intestinal tracts constitutes dietary fibre products.

As intimated above, the water insoluble residual products which are formed on the comminution extraction of vegetables, for example pulp from sugar beets, potatoes, citrus fruits, apples etc., are frequently used as raw material in the production of dietary fibre products. In such instance, the water-insoluble residual products generally include parts of the starting material, foreign materials and/or substances formed during the processing thereof which are undesirable in the finished product. Non-limiting examples are substances imparting an unpalatable flavor or odor (such as aldehydes, ketones, geosmin, etc), peel, cores, burnt particles, soot flakes and the like, as well as earth particles such as sand. The generic term impurities will be employed herein to define such undesirable parts, materials and substances.

In order to be able to employ the plant fibres in the diet, for example as a dietary supplement, it is necessary that the impurities have been removed from the plant fibres beforehand.

The presence of sand particles constitutes a particular problem in the recovery of plant fibres of the kind mentioned above in that said particles adhere to the plant fibres or are embedded therein. Such is for example the case in the sugar beet pulp which constitutes the residual product in the extraction of sugar from sugar beets.

OBJECTS OF THE PRESENT INVENTION

The present invention seeks a method and an apparatus for treating plant fibrous material while removing impurities contained therein.

BRIEF DESCRIPTION OF THE DRAWING

The invention will be explained below with reference to the accompanying drawing, wherein.

DETAILED DESCRIPTION

Figure 1:
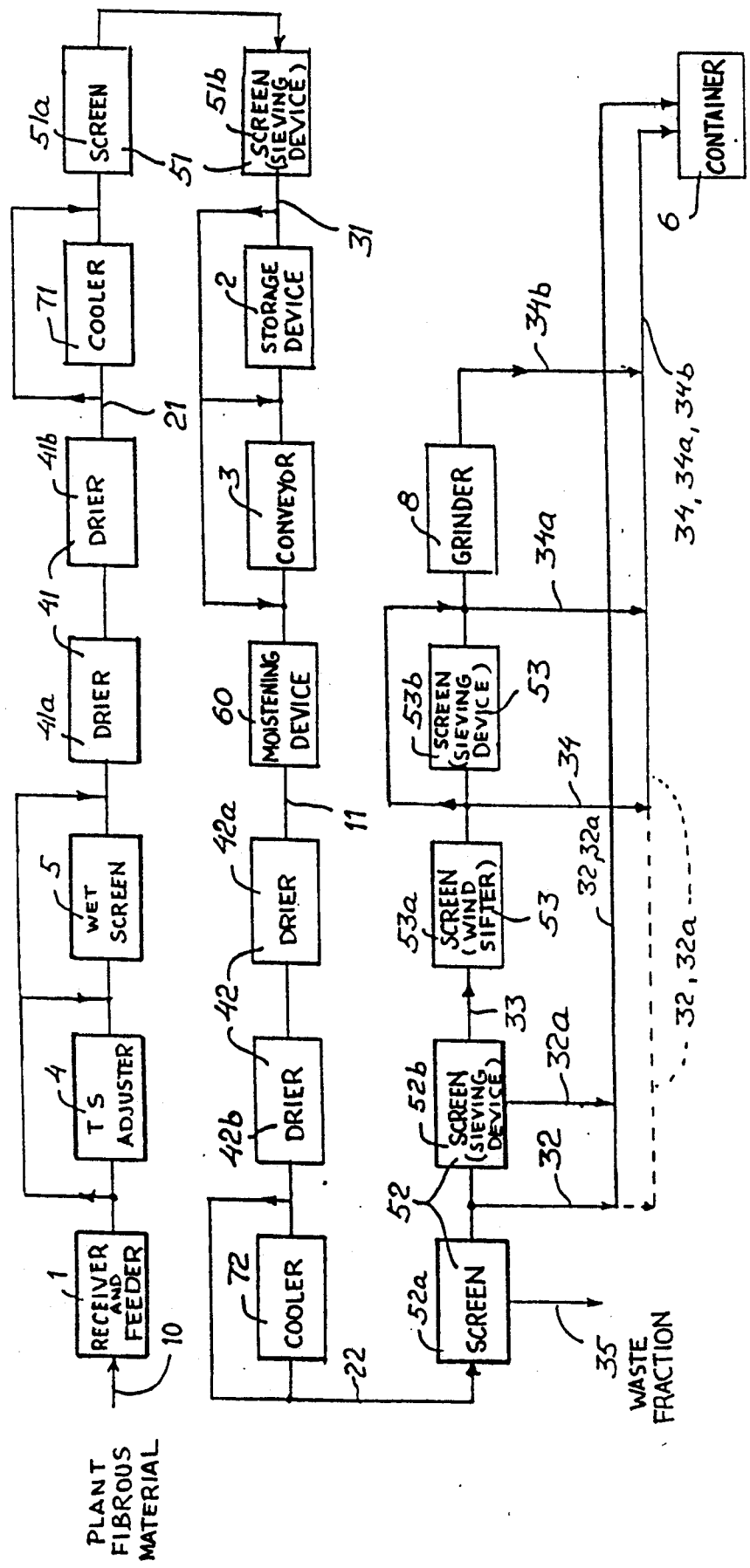
FIG. 1 is a block diagram of an apparatus according to the present invention.

FIG. 1 shows an embodiment of the present invention comprising receiving and feeding means 1 for a plant fibrous material 10, said means being connected to a first means 41 for adjusting the total solids (TS) content of the material. In the present embodiment, said first means consists of a drier 41. In certain embodiments the first means is followed by a first cooling means 71. The first drying means is connected to a first separator means 51, where applicable via the first cooling means.

Said first set of processing means is followed by a second set of means including a moistening device 60, a second means 42 for adjusting the TS content of the material, as a rule a drier 42, which is generally followed by a second cooling means 72. A second separator means 52 constitues the last means in this second set. In certain embodiments, a third separator means 53 is provided after the second separator means. As a rule, there is provided between the first separator means 51 and the moistening device 60, a storage device 2 and at least one conveying means 3 connected thereto for displacing material from the first separator means to the storage device and thence to the moistening device 60. The storage device generally consists of one or more substantially closed containers, while the conveying means consists, for example, of conduits, belt conveyors, screw conveyors or other means known to persons skilled in this art and adapted to suit the consistency of material to be displaced.

In those embodiments wherein the first and second means, respectively, for adjusting the TS content of material include a drier, both the first drying means 41 and the second drying means 42 as a rule include a steam drier 41a, 42a and an after drier 41b, 42b disposed thereafter. Similarly, the first separator means 51 and/or the second separator means 52 include as a rule at least two mutually subsequently disposed partial separator means, one of the partial separator means preferably consisting of a density separator and 52a, respectively, and one of the partial separator means consisting of a sieving device 51b and 52b, respectively, preferably a mesh strainer. In embodiments including the third separator means 53, this as a rule includes at least two mutually subsequently disposed part separator means, one of the part separator means consisting of a density separator 53a and one of the part separator means consisting of a sieving device 53b, preferably a mesh strainer. The drying means are adjustable to drying temperatures of up to 200° C., the drying temperature being as a rule adjusted individually for each respective means. In those cases in which the first cooling means 71 and/or the second cooling means 72 are employed, the capacity of each respective cooling means is, of course, adapted to the temperature of the material when it is received, the magnitude of the received material flow and the desired stay-time for the material in each respective cooling means.

In certain embodiments, the first set of the processing means is preceded by a wet screen 5 which, in embodiments in which the TS content of the received plant fibrous material needs to be adjusted, is preceded by a wetting device and/or drying device 4 in which the TS content of the fibrous material has, to achieve optimum utilization of the wet screen, been adjusted to a level which is adapted to the screening properties of the wet screen.

While, in the foregoing description, each one of the separator means has been disclosed as including, as a rule, one density separator and one sieving device, the density separator preceding the sieving device, it will be obvious to the skilled artisan that, in certain embodiments, the sequence of the part separator means will be the reverse, at least in certain separator means.

If a density separator is included in the separator means, this is designed, in certain embodiments, as a wind sifter.

When the apparatus according to the embodiment illustrated in FIG. 1 is put into practice, the plant fibrous material 10 is supplied to the first drying means 41 in which a TS content of at least 25% is imparted to the material. However, in certain embodiments the TS content is, because of the nature of the material, adjusted to considerably higher values. The TS content is, according to the invention, adjusted such that the material obtains a "granular" character, i.e. sufficiently high TS content to avoid the risk that the particles of the material stick to one another and sufficiently low TS content to avoid the risk that the particles cake together or agglomerate. However, in one preferred embodiment, the TS content is adjusted to such high values that a fibrous first fraction 31 (described in greater detail below) formed at the subsequent separator withstands storage without commensement of material degradation (Fibres in the material have a better durability than other component parts therein such as sugar, fat, etc.) In embodiments in which the apparatus is adapted for utilizing the plant fibres from the residual products formed in the extraction of sugar from sugar beets, the TS content is, in one preferred embodiment, consequently adjusted to values of at least approx. 80%, and generally at least 86%.

By the adjustment of the TS content of the received material 10, and by a possible subsequent cooling in the first cooling means 71, a first substance 21 will be formed from the material, this substance being fed into the first separator means 51. In this separator means, the first substance 21 is fractionated to form the first fraction 31 which comprises the major portion of the fibres included in the plant fibrous material. The first fraction is thereafter given reduced TS content in the moistening device 60 so as to form a first mass 11 which is dried in the second drying means 42, and, in certain physical applications, also cooled in the second cooling means 72 to form a second substance 22. This is supplied to the second separator means 52 in which it is fractionated for forming a second fraction (32, 32a) comprising substantially only plant fibres.

In those embodiments in which a sieving device 51b, 52b is included in the first separator means 51 and the second separator means 52, respectively, the first substance 21 and/or the second substance 22 are fractionated in terms of size, in which event the first separator means 51 and the second screening means 52 are, as a rule, adjusted so as to form, from the first substance 21 and from the second substance 22, respectively, the first fraction 31 and the second fraction 32 in that each separator means separates bodies above a certain size and below a certain size. Hereby, the first fraction 31 and the second fraction 32, respectively, will consist of bodies within a first size range and a second size range, respectively, whose limits are determined by the current setting of each respective separator means. The setting of the first separator means 51 entails that the first fraction comprises the major part of the fibres included in the plant fibrous material 10.

In embodiments in which a density separator, for example a wind sifter, is included in the first separator means 51 and/or in the second separator means 52, the first substance 21 and/or the second substance 22 will be fractionated in terms of density, i.e, in reality in terms mean density, in which instance the first separator means 51 and the second separator means 52, respectively, are adjusted so as to separate, out of the first substance 21 and the second substance 22, respectively, on formation of the first fraction and the second fraction 32, respectively, bodies of a mean density in excess of the maximum mean density of those bodies of substantially plant fibres which are included in the plant fibrous material. Hereby, the first fraction 31 and the second fraction 32, respectively, will consist of bodies of a mean density which is less than a value determined by the actual setting of each respective separator means. The first separator means 51 has a setting which entails that the first fraction comprises the major portion of the fibres included in the plant fibrous material 10.

It will be obvious to one skilled in the art that the present invention encompasses a number of separator alternatives. Thus, it applies according to the present invention that, in a first embodiment, the first substance 21 is fractionated in terms of size and the second substance 22 is fractionated in terms of density, that in a second embodiment, the first substance 21 is fractionated in terms of density and the second substance 22 is fractionated in terms of size, that in a third embodiment, both the first substance 21 and the second substance 22 are fractionated in terms of density, and that, in a fourth embodiment, both the first substance 21 and the second substance 22 are fractionated in terms of size.

Those bodies of substantially plant fibres which are supplied to the apparatus and pass therethrough, are, as a rule, of a density which varies from body to body and often also between different parts of each respective body. The reason for this is the building and structure of the plant fibrous material proper, the treatment to which the plant fibrous material was subjected before being fed into the apparatus, or the treatment to which the plant fibres are subjected in the apparatus according to the present invention. Similarly, the density of different parts of bodies which enclose impurities or to which impurities adhere, for example grains of sand, varies with a density which manifestly deviates from the density of the plant fibres. Consequently, it is inappropriate in such circumstances to employ such expressions as the density of the bodies. Instead, the expression mean density is used in this specification, which is that value which is obtained if the weight of each respective body is divided by the volume of the body.

If the plant fibres which are included in the first fraction 31 are studied, it will be found that impurities, for example grains of sand, adhere to or are embedded in certain of the plant fibres. The reason for this is that, during the earlier treatment of the fibres—for example to extract pulp from sugar beets—preconditions are created which entail that the plant fibres enclose impurities, for example earth particles, such as grains of sand, or that the plant fibres will have such a structure that the impurities adhere to the plant fibres. As long as the impurities for instance the grains of sand) adhere to or are enclosed by the plant fibres, it is impossible to separate the impurities from the plant fibres. However, it has surprisingly proved possible according to the invention that, by increasing the moisture content of the first fraction 31, most of the impurities from the plant fibres are released and the adhesion of the impurities to the plant fibres is reduced, respectively. This hereby creates the possibility of separating the impurities from the fibres. What in reality is achieved by the reduction of the TS content is a structural modification combined with a swelling of the individual fibres. The swelling occurs when the pores of tho fibres are supplied with moisture and, according to the present invention, the fibres are, as a rule, allowed to swell to a degree corresponding to a volume increase of at least 50%, as a rule at least 100% and Preferably at least 150%. The values given here are primarily related to sugar beet fibres, but it will be readily perceived by one skilled in the art that the swelling (the expansion) in each case may, as required, be adapted to the properties of the relevant fibre material. In such an event, the fibres open and adhering or enclosed impurities, for example earth particles such as grains of sand, are released from or are later given the possibility of being released from the plant fibres in their continued treatment.

When the present invention is reduced to practice, the TS content TS1 of the first substance is, as a rule, adjusted to a level which deviates from the TS content TS2 of the second substance and is preferably less than the TS content of the second substance. By way of example, the first fraction is adjusted by the moistening device 60 for forming the first pulp 11 at a TS content of less than 60%, generally less than 50% and, in one preferred embodiment, less than 40%.

The first mass is displaced to the second drying means 42 for the formation of the second substance 22 which after cooling in the cooling means 52 (where applicable) is supplied to the second separator means 52. When it is supplied to the second separator means, the second substance has a TS content in excess of 60%, generally in excess of 75% and preferably in excess of 80%. In embodiments in which the apparatus according to the present invention is adapted to recover plant fibres from the residual product which is formed upon the extraction of sugar from sugar beets, the TS content is adjusted within the range of approx. 85-96% and, as a rule, within the range of between 89 and 95%.

On passage to and through the second drying means and, where applicable, on passage through the second cooling means 72, the plant fibres together with the impurities are generally exposed to acceleration and retardation movements which contribute to the impurities and fibres being quite simply physically separated from one another even if they are still included in the second substance. In the second separator means 52, the second fraction 32—which includes the major portion of the plant fibres included in the plant fibrous material—is separated from the second mass 22. As a rule, the greater part of the just-mentioned separation is effected by means of the density separator 52a included in the second separator means 52, this operation utilizing the phenomenon that the plant fibres and the impurities which, in the vast majority, consist of earth particles such as sand, are of mutually differing densities. In this separation, there are formed a waste fraction 35 substantially consisting of sand, and the second fraction 32, 32a, comprising the major portion of the plant fibres included in the plant fibrous material fed into the apparatus, this second fraction being substantially freed of impurities.

In the density separator, the density separator is adjusted so as to remove, from each respective substance, bodies of a density or mean density, respectively, in excess of a maximum predetermined value. This value exceeds the value of the mean density of the plant fibre material included in the substance.

The second separator means includes, as a rule, also the second part separator means 52b which consists of a sieving device. This is adjusted so as to select, from the supplied material, bodies within a second size range which is encompassed by the first size range defined above in connection with the first separator means 51. In certain embodiments, this second size range is selected so as to be reduced in relation to the first size range. Hereby, the dimension range for those plant fibres included in the second fraction 32a will be determined.

In, for example, the extraction of fibres from sugar beet pulp, grains of sand and other heavy impurities of dimensions substantially exceeding approx. 1.5 mm and other materials are removed in the second separator means, this material hence also including plant fibres of dimensions in excess of approx. 5 mm or of less than approx. 0.9 mm.

In certain embodiments, a third fraction 33 is separated on the formation of the second fraction 32, this third fraction consisting of fibres and, as a rule, a slight Proportion of impurities in which the sizes of both the fibres and the impurities fall within a third size range within which the maximum size substantially corresponds to or is slightly less than the smallest size of the fibres in the second fraction 32. The third fraction 33 is supplied to the third separator means 53. The third separator means removes bodies of a mean density in excess of the highest mean density of plant fibres included in the third fraction. There will hereby be formed a fourth fraction 34, 34a, 34b consisting substantially of plant fibres and with a very slight proportion of impurities.

In certain embodiments, in which a slight size variation of the plant fibres is the contemplated objective, plant fibres and any possible impurities of a maximum size which is less than a certain minimum size in order to permit remaining material to form or be included in the fourth fraction are separated from the third fraction 33 by means of the third separator means 53. This minimum size corresponds substantially to or is preferably less than the minimum size of the plant fibres included in the second fraction 32, 32a. This is achieved in that the third separator means 53 is adjusted so as to separate the above-mentioned plant fibres out of the third fraction 33.

The second and/or fourth fraction 32, 32a; 34, 34a, 34b, is supplied to a container or package 6. In certain embodiments, the second and/or fourth fraction is subjected to a grinding process in a mill 8 before being supplied to the container or package. The block diagram illustrates solely how the third separator means is connected to the mill. Once it has passed the mill, the fourth fraction 34, 34a, is designated by reference numeral 34b. In yet a further embodiment, the second and fourth fractions are mixed with one another prior to being fed to the mill or the container or package, respectively.

The plant fibres which are processed in the manner as described in the foregoing are substantially freed of the unpleasant flavor possessed by the fibres prior to being processed.

The above-disclosed selected values for temperatures, TS content or the swelling of the fibres are, as has already been stated, primarily adapted to the processing of plant fibres formed in the extraction of sugar from sugar beets. It will be obvious, however, to those skilled in the art that the disclosed values may, without departing from the spirit and scope of the present invention, be adapted to suit those particular requirements which are related to the recovery of plant fibres from other residual products. The above detailed description has, also in other respects, referred to but a limited number of embodiments of the present invention but it will be readily perceived by those skilled in the art that the present invention encompasses a large number of embodiments without departing from the spirit and scope of the appended claims.

What is claimed is:

1. A method for treating plant fibrous material obtained as a residual product from a preprocessing treatment of an agricultural product, to remove impurities therein, for producing a purified dietary fiber supplemental product, said method comprising adjusting said plant fibrous material to a total solids (TS) content of at least approximately 25% for forming a first substance; fractionating said first substance in a first separator means to form a first fraction comprising the major portion of the plant fibers included in the plant fibrous material; reducing the TS-content of said first fraction for the formation of a first mass; drying said first mass for the formation of a second substance; and fractionating said second substance in a second separator means for forming a second fraction comprising substantially only plant fibres.

2. The method as claimed in claim 1, comprising effecting said fractionating of said first substance with respect to size; and effecting said fractionating of the second substance with respect to density.

3. The method as claimed in claim 1, wherein the TS content of the first substance deviates from the TS content of the second substance.

4. The method as claimed in claim 3 wherein the TS content of the first substance is less than that of the second substance.

5. The method as claimed in claim 1, comprising separating a third fraction in the second separator means, said third fraction consisting of plant fibres with any possible accompanying impurities of sizes within a range within which the maximum size substantially corresponds to or is slightly less than the smallest size of the fibres in the second fraction; and forming a fourth fraction consisting substantially of plant fibres from the third fraction by the removal from the third fraction, by means of a third separator means, of bodies of a mean density exceeding the highest mean density of plant fibres included in the third fraction.

6. The method as claimed in claim 5, comprising forming said fourth fraction is formed of plant fibres of a size substantially corresponding to or less than the smallest size of the plant fibres included in the second fraction and the third separator means separates said plant fibres from the third fraction.

7. The method as claimed in claim 1 comprising effecting the fractionating of the first substance in respect of density; and effecting said fractionating of the second substance in respect of size.

8. The method as claimed in claim 1 comprising effecting the fractionating of the first substance and the second substance both with respect to one of density and size.

9. An apparatus for treating a plant fibrous material obtained as a residual product from a preprocessing treatment of an agricultural product, to remove impurities therein for producing a purified dietary fiber supplemental product, said apparatus comprising a first means for forming after reception of the plant fibrous material by adjusting of the total solids (TS) content of the material a first substance; a first separator means disposed to receive said first substance for fractionating the same for forming a first fraction including at least a major portion of the plant fibers included in the plant fibrous material; a moistening device supplied with said first fraction to increase its liquid content and form a first mass; a second means supplied with said first mass for adjusting the TS content thereof to form a second substance and fractionating the same for formation of a second fraction comprising substantially exclusively plant fibers, at least one of said first means and said second means comprising a drying means.

10. The apparatus as claimed in claim 9, wherein at least one of the first separator means and the second separator means includes a density separator comprising a wind sifter.

11. The apparatus as claimed in claim 9, wherein at least one of the first separator means and the second separator means includes a sieving device comprising a mesh strainer.

12. The apparatus as claimed in claim 9 comprising means for the forced positive cooling of the first substance discharged from said first means disposed between said first means and the first separator means.

13. The apparatus as claimed in claim 9, wherein the second separator means includes means for separating, from the second substance, a third fraction in which is included plant fibres together with possible impurities of dimensions which are substantially less than the dimensions of the plant fibres in the second fraction and third separator means for separating from the third fraction a fourth fraction comprising plant fibres within a size range of maximum dimensions substantially corresponding to or slightly less than the dimensions of the smallest fibres in the second fraction.

14. The apparatus as claimed in claim 13, wherein said third separator means includes a density separator comprising a wind sifter.

15. The apparatus as claimed in claim 13, wherein said third separator means includes a sieving device comprising a mesh strainer.

16. The apparatus as claimed in claim 9 comprising a wet screen preceding said first means.

17. The apparatus as claimed in claim 9 wherein said drying means comprises a steam drier.

18. An apparatus for treating a plant fibrous material obtained as a residual product from a preprocessing treatment of an agricultural product, to remove impurities therein for producing a purified dietary fiber supplemental product, said apparatus comprising a first means for forming after reception of the plant fibrous material by adjusting of the total solids (TS) content of the material a first substance; a first separator means disposed to receive said first substance for fractionating the same for forming a first fraction including at least a major portion of the plant fibers included in the plant fibrous material; a moistening device supplied with said first fraction to increase its liquid content and form a first mass; a second means supplied with said first mass for adjusting the TS content thereof, to form a second substance; a second separator means receiving said second substance and fractionating the same for formation of a second fraction comprising substantially exclusively plant fibers; and means for the forced positive cooling of the second substance discharged from the second means disposed between said second means and the second separator means.

* * * * *